(12) United States Patent
Lee et al.

(10) Patent No.: US 12,728,064 B2
(45) Date of Patent: Sep. 8, 2026

(54) MOTION ASSISTANCE APPARATUS

(71) Applicant: KOREA INSTITUTE OF SCIENCE AND TECHNOLOGY, Seoul (KR)

(72) Inventors: Jongwon Lee, Seoul (KR); Jong Bok Lee, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 689 days.

(21) Appl. No.: 18/303,448

(22) Filed: Apr. 19, 2023

(65) Prior Publication Data

US 2024/0099923 A1 Mar. 28, 2024

(30) Foreign Application Priority Data

Sep. 28, 2022 (KR) ........................ 10-2022-0123533

(51) Int. Cl.
*A61H 3/00* (2006.01)
*B25J 9/00* (2006.01)
*B25J 9/10* (2006.01)

(52) U.S. Cl.
CPC .............. *A61H 3/00* (2013.01); *B25J 9/0006* (2013.01); *B25J 9/102* (2013.01); *A61H 2003/007* (2013.01); *A61H 2201/1215* (2013.01); *A61H 2201/1642* (2013.01); *A61H 2201/165* (2013.01)

(58) Field of Classification Search
CPC ...... A61H 1/0244; A61H 1/0262; A61H 3/00; A61H 2003/007; A61H 2201/163; A61H 2201/1215; B25J 9/0006; B25J 9/102
See application file for complete search history.

(56) References Cited

U.S. PATENT DOCUMENTS 7,429,253 B2 * 9/2008 Shimada .................. A61H 3/00 602/19
11,185,975 B2 11/2021 Hyun
2011/0066088 A1 * 3/2011 Little ................... A61H 1/0255 601/35
2016/0151227 A1 * 6/2016 Choi ......................... F16B 7/22 623/27
2017/0086990 A1 * 3/2017 Choi ....................... A61F 2/605
2017/0340504 A1 * 11/2017 Sanz Merodio ....... B25J 9/0006
2019/0060154 A1 * 2/2019 Lee ...................... A61H 1/0281
2021/0369533 A1 * 12/2021 Huang .................. B25J 9/0006
(Continued)

FOREIGN PATENT DOCUMENTS

JP 3119913 U 3/2006
KR 10-2020-0099664 A 8/2020
(Continued)

*Primary Examiner* — Douglas Y Sul

(57) ABSTRACT

Provided is a motion assistance apparatus that includes a fixing module which is fixed to a part of the body of a user, a support module which supports another part of the body of the user and is rotatable relative to the fixing module, a first driving module which is positioned between the fixing module and the support module and abducts the support module relative to the fixing module, and a second driving module which flexes the support module relative to the fixing module. The first driving module includes an abduction motor, and a first axis serving as an abduction axis of the first driving module is positioned at the same height as or lower than a second axis serving as a flexion axis of the second driving module.

18 Claims, 9 Drawing Sheets

(56) References Cited

U.S. PATENT DOCUMENTS

| | | | | |
|---|---|---|---|---|
| 2022/0175608 | A1* | 6/2022 | Takahashi | G16H 40/63 |
| 2022/0401284 | A1* | 12/2022 | Arzanpour | B25J 9/1615 |
| 2023/0007984 | A1* | 1/2023 | Sarkisian | A61H 1/0237 |

FOREIGN PATENT DOCUMENTS

| | | | |
|---|---|---|---|
| KR | 10-2022-0098532 | A | 7/2022 |
| WO | 2019/198267 | A1 | 10/2019 |
| WO | 2019/198268 | A1 | 10/2019 |

* cited by examiner

MOTION ASSISTANCE APPARATUS

CROSS-REFERENCE TO RELATED APPLICATIONS

This U.S. non-provisional patent application claims priority under 35 U.S.C. § 119 of Korean Patent Application No. 10-2022-0123533, filed on Sep. 28, 2022, the entire contents of which are hereby incorporated by reference.

BACKGROUND

The present disclosure herein relates to a motion assistance apparatus, and more particularly, to a motion assistance apparatus capable of assisting adduction and abduction of the legs.

Various types of motion assistance apparatuses may be used to assist the motion of people who have abnormalities in some body functions. For example, a walking assistance apparatus may be used to assist people having walking difficulties in walking. The walking assistance apparatus may be worn on the legs of the body. The walking assistance apparatus may transmit a driving force to the legs when the legs move. To this end, the walking assistance apparatus may include a driving module.

SUMMARY

The present disclosure provides a motion assistance apparatus capable of assisting abduction of the legs.

The present disclosure also provides a motion assistance apparatus capable of abduction independent of flexion.

The present disclosure also provides a motion assistance apparatus capable of applying a driving force when the leg abducts.

The present disclosure also provides a motion assistance apparatus capable of compensating for the eccentricity of the rotation center of abduction of the motion assistance apparatus from the rotation center of the leg of the body.

The objects of the present disclosure are not limited to the aforementioned objects, but other objects not described herein will be clearly understood by those skilled in the art from the following description.

An embodiment of the inventive concept provides a motion assistance apparatus including: a fixing module which is fixed to a part of the body of a user; a support module which supports another part of the body of the user and is rotatable relative to the fixing module; a first driving module which is positioned between the fixing module and the support module and abducts the support module relative to the fixing module; and a second driving module which flexes the support module relative to the fixing module, wherein the first driving module includes an abduction motor, and a first axis serving as an abduction axis of the first driving module is positioned at the same height as or lower than a second axis serving as a flexion axis of the second driving module.

In the motion assistance apparatus according to an embodiment, the first driving module may further include: a bracket fixed to a lower side of the second driving module; an abduction shaft coupled to the bracket; an upper bevel gear coupled to the abduction shaft; and a lower bevel gear which engages with the upper bevel gear and is connected to the abduction motor, wherein the abduction motor is connected to the abduction shaft to be rotatable about the abduction shaft.

In the motion assistance apparatus according to an embodiment, the first driving module may further include a module housing that surrounds the abduction motor, and the module housing may be rotatably coupled to the abduction shaft.

In the motion assistance apparatus according to an embodiment, the support module may include: a support band fixed to the leg of the user; and a support connector configured to connect the support band to the first driving module, wherein the support connector is coupled to the module housing.

In the motion assistance apparatus according to an embodiment, the abduction shaft may be coupled and fixed to the bracket, the upper bevel gear may be coupled and fixed to the abduction shaft, and the lower bevel gear may be rotated by the abduction motor.

In the motion assistance apparatus according to an embodiment, the second driving module may include a flexion motor.

In the motion assistance apparatus according to an embodiment, the fixing module may include: a fixing band fixed to the waist of the user; and a fixing coupler configured to connect the fixing band to the second driving module.

In the motion assistance apparatus according to an embodiment, the support module may include: a support band fixed to the leg of the user; and a support connector configured to connect the support band to the first driving module, wherein the support band provides a slide hole, and a portion of the support connector is inserted into the slide hole, and the support connector is slidably coupled to the support band.

In the motion assistance apparatus according to an embodiment, the second driving module may be positioned between the fixing module and the first driving module.

In an embodiment of the inventive concept, a motion assistance apparatus includes: a fixing module fixed to the waist of a user; a support module configured to support the leg of the user; and a first driving module which is positioned between the fixing module and the support module and abducts the support module relative to the fixing module, wherein the support module includes: a support band fixed to the leg of the user; and a support connector configured to connect the support band to the first driving module, wherein the support band provides a slide hole, and a portion of the support connector is inserted into the slide hole, and the support connector is slidably coupled to the support band.

In the motion assistance apparatus according to an embodiment, the slide hole may extend vertically.

In the motion assistance apparatus according to an embodiment, the support connector may include: a connection body of which one side is connected to the first driving module; and a slide member which is connected to the other side of the connection body and of which a portion is inserted into the slide hole.

In the motion assistance apparatus according to an embodiment, the support band may further include an elastic member, and the elastic member may be coupled to the slide hole to press the slide member.

In the motion assistance apparatus according to an embodiment, the slide member may be rotatably coupled to the connection body.

In the motion assistance apparatus according to an embodiment, two support modules may be provided, and the two support modules may be spaced apart from each other in a horizontal direction.

In the motion assistance apparatus according to an embodiment, a second driving module may be further provided, which is positioned between the fixing module and the first driving module and flexes the support module relative to the fixing module.

In an embodiment of the inventive concept, a motion assistance apparatus includes: a support module; a fixing module spaced apart from the support module in a first direction; a first driving module which is positioned between the support module and the fixing module and rotates the support module relative to the fixing module; and a second driving module which is positioned between the first driving module and the fixing module and rotates the support module relative to the fixing module, wherein the first driving module rotates the support module about a second direction that crosses the first direction, and the second driving module rotates the support module about a third direction that crosses both the first direction and the second direction.

In the motion assistance apparatus according to an embodiment, two support modules may be provided, and the two support modules may be spaced apart from each other in the third direction.

In the motion assistance apparatus according to an embodiment, the first driving module may include an abduction motor, and the second driving module may include a flexion motor.

In the motion assistance apparatus according to an embodiment, the support module may include: a support band fixed to the leg of a user; and a support connector configured to connect the support band to the first driving module, wherein the support band provides a slide hole, and a portion of the support connector is inserted into the slide hole, and the support connector is slidably coupled to the support band.

Specific features of other embodiments are included in the detailed description and drawings.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
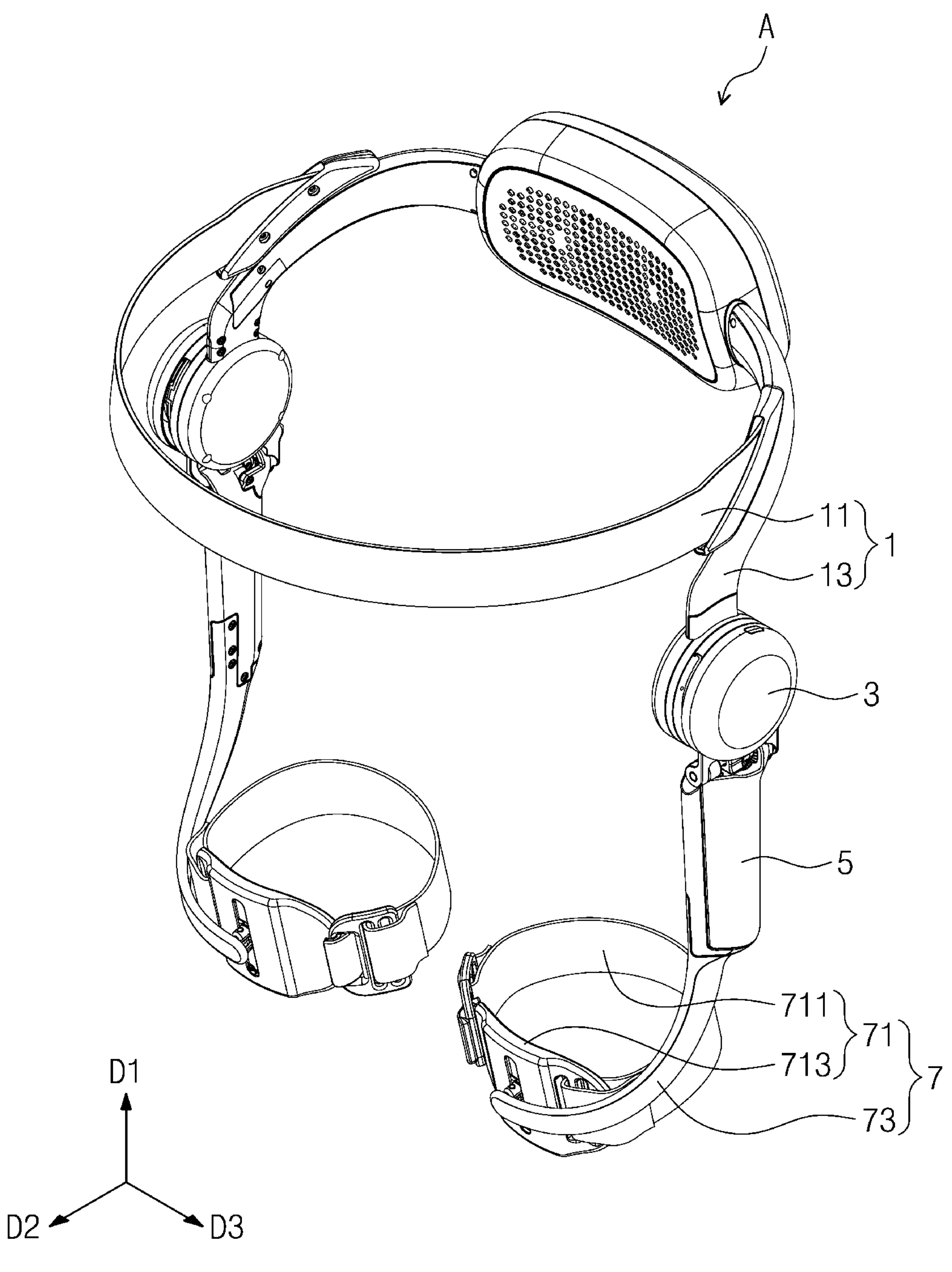
FIG. 1 is a perspective view showing a motion assistance apparatus according to embodiments of the inventive concept.

Embodiments of the inventive concept will be described with reference to the accompanying drawings so as to sufficiently understand configurations and effects of the inventive concept. However, the inventive concept may not be limited to the embodiments set forth herein but embodied in different forms and diversely modified. Rather, these embodiments are provided so that the disclosure of the inventive concept will be thorough and complete, and will fully convey the scope of the disclosure to a person skilled in the art to which the present disclosure pertains.

Like reference numerals refer to like elements throughout. The embodiments herein will be described with reference to a block diagram, a perspective view, and/or a cross-sectional view as ideal exemplary views of the inventive concept. In the drawing, the thicknesses of regions are exaggerated for effective description of the technical contents. Therefore, regions exemplified in the drawings have general properties, and shapes of the regions exemplified in the drawings are used to illustrate a specific shape of a device region, but not intended to limit the scope of the disclosure. Although various terms are used to describe various components in various embodiments herein, the components should not be limited to these terms. These terms are only used to distinguish one component from another component. The embodiments described and exemplified herein include complementary embodiments thereof.

The terms used herein are used only for explaining embodiments while not limiting the present disclosure. In this specification, the singular forms include the plural forms as well, unless the context clearly indicates otherwise. The meaning of 'comprises' and/or 'comprising' used herein does not exclude the presence or addition of one or more other components besides the mentioned components.

Hereinafter, the present disclosure will be described in detail by describing embodiments of the inventive concept with reference to the accompanying drawings.

FIG. 1 is a perspective view showing a motion assistance apparatus according to embodiments of the inventive concept.

Hereinafter, D1 may be referred to as a first direction, D2 crossing the first direction D1 may be referred to as a second direction, and D3 crossing both the first direction D1 and the second direction D2 may be referred to as a third direction. The first direction D1 may be referred to as the vertical direction. Also, each of the second direction D2 and the third direction D3 may be referred to as the horizontal direction.

Referring to FIG. 1, a motion assistance apparatus A may be provided. The motion assistance apparatus A may be an apparatus for assisting the motion of the body. More specifically, the motion assistance apparatus A may assist the motion of the legs of the body. To this end, the motion assistance apparatus A may include a fixing module 1, a support module 7, a first driving module 5, and a second driving module 3.

The fixing module 1 may be fixed to a part of the body of a user. For example, the fixing module 1 may be fixed to the waist. To this end, the fixing module 1 may include a fixing band 11 and a fixing coupler 13.

The fixing band 11 may surround the waist of the user. To this end, the fixing band 11 may have a band shape having a size similar to that of the waist of a human body. The size of the fixing band 11 may be changed so as to correspond to different waist sizes for each user.

The fixing coupler 13 may connect the fixing band 11 to the second driving module 3. Two fixing couplers 13 may be provided. The two fixing couplers 13 may be spaced apart from each other in the third direction D3. Hereinafter, however, the fixing coupler 13 will be described in singular form for convenience.

The support module 7 may be spaced apart from the fixing module 1 in a direction opposite to the first direction D1. That is, the support module 7 may be positioned below the fixing module 1. The fixing module 7 may support another part of the body of the user. For example, the support module 7 may support the leg of the user. To this end, the support module 7 may include a support band 71 and a support connector 73.

The support band 71 may be fixed to the leg of the user. The fixing band 71 may have a band shape having a size similar to that of the leg of a human body. The size of the support band 71 may be changed so as to correspond to different leg sizes for each user. To this end, the support band 71 may include a band portion 711 and a band coupling portion 713. The band portion 711 may include a flexible material. The band coupling portion 713 may fix the band portion 711. This will be described later in detail.

The support connector 73 may connect the support band 71 to the first driving module 5. For example, the support connector 73 may connect the band coupling portion 713 to the first driving module 5. The support connector 73 may be coupled to the support band 71 so as to be slidable relative to the support band 71. This will be described later in detail.

Two support modules 7 may be provided. The two support modules 7 may be spaced apart from each other in the third direction D3. Hereinafter, however, the support module 7 will be described in singular form for convenience.

In embodiments, the support module 7 may rotate relative to the fixing module 1. For example, the support module 7 may perform adduction and abduction relative to the fixing module 1. That is, the support module 7 may rotate about an axis parallel to the second direction D2 relative to the fixing module 1. Also, the support module 7 may perform extension and flexion relative to the fixing module 1. That is, the support module 7 may rotate about an axis parallel to the third direction D3 relative to the fixing module 1. An abduction axis may be positioned at a lower height than a flexion axis. That is, the abduction axis may be positioned below the flexion axis. Also, the abduction axis may be positioned at the same height as the flexion axis. That is, the level of the abduction axis may be less than or equal to the level of the flexion axis. This will be described later in detail.

The first driving module 5 may adduct and abduct the support module 7 relative to the fixing module 1. In embodiments, the first driving module 5 may be positioned between the support module 7 and the second driving module 3. That is, the first driving module 5 may be positioned below the second driving module 3. The first driving module 5 is positioned below the second driving module 3, and thus, the first driving module 5 may adduct and abduct the support module 7 relative to the second driving module 3. To this end, the first driving module 5 may include an abduction motor or the like. This will be described later in detail.

The second driving module 3 may extend and flex the support module 7 relative to the fixing module 1. To this end, the second driving module 3 may include a flexion motor (not shown). The flexion motor may generate rotational energy by receiving electric energy. Accordingly, the second driving module 3 may extend and flex the support module 7 relative to the fixing module 1. In embodiments, the second driving module 3 may be positioned between the fixing module 1 and the first driving module 5. That is, the second driving module 3 may be positioned above the first driving module 5. This will be described later in detail.

Figure 2:
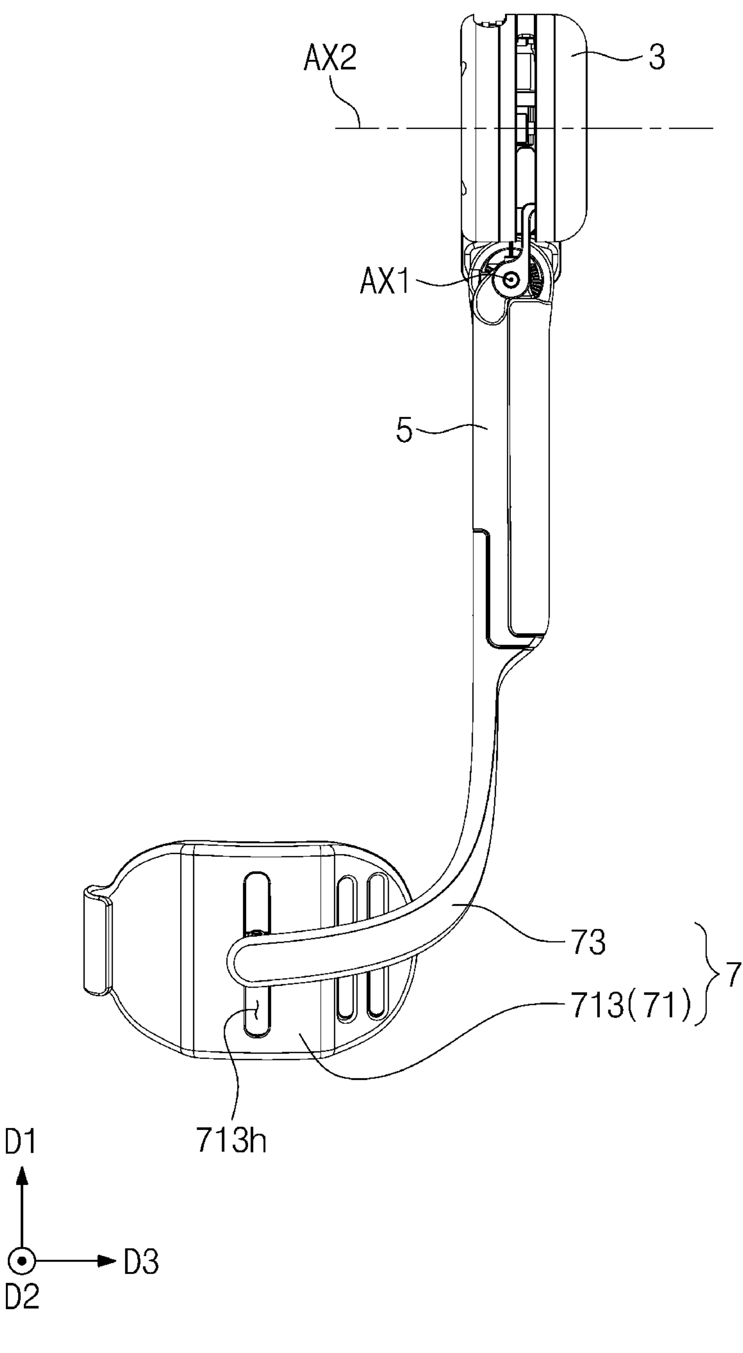
FIG. 2 is a front view showing a portion of the motion assistance apparatus according to embodiments of the inventive concept.

FIG. 2 is a front view showing a portion of a motion assistance apparatus according to embodiments of the inventive concept.

Referring to FIG. 2, the support band 71 may provide a slide hole 713*h*. The slide hole 713*h* may be provided in the band coupling portion 713. The slide hole 713*h* may extend in the first direction D1. That is, the slide hole 713*h* may extend vertically. A portion of the support connector 73 is inserted into the slide hole 713*h*, and the support connector 73 may slide relative to the support band 71. Accordingly, the support connector 73 may move vertically relative to the support band 71.

The first driving module 5 may rotate about a first axis AX1 parallel to the second direction D2. The first axis AX1 may serve as an abduction axis. The second driving module 3 may rotate about a second axis AX2 parallel to the third direction D3. The second axis AX2 may serve as a flexion axis. The level of the first axis AX1 may not be higher than the level of the second axis AX2. That is, the first axis AX1 may be positioned at the same height as or lower than the second axis AX2. This will be described later in detail.

Figure 3:
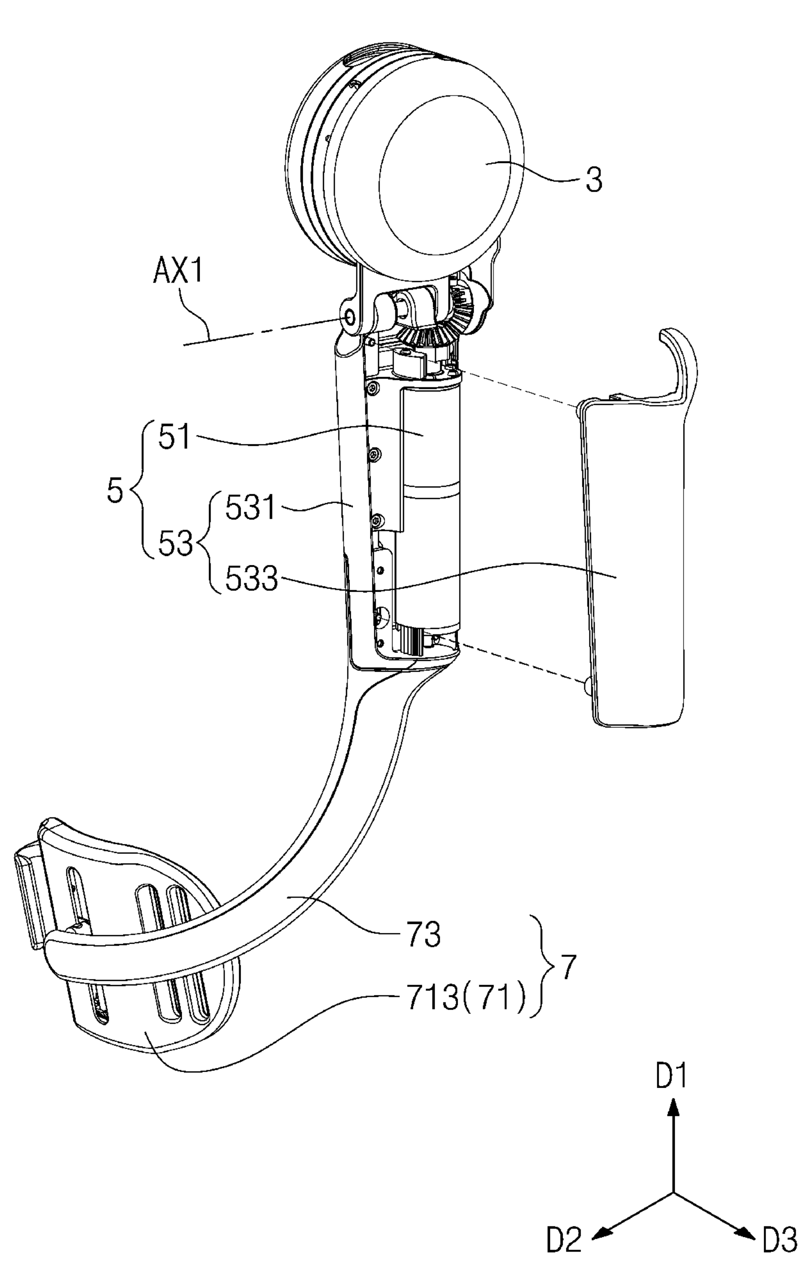
FIG. 3 is a partially exploded perspective view showing a portion of the motion assistance apparatus according to embodiments of the inventive concept.
Figure 4:
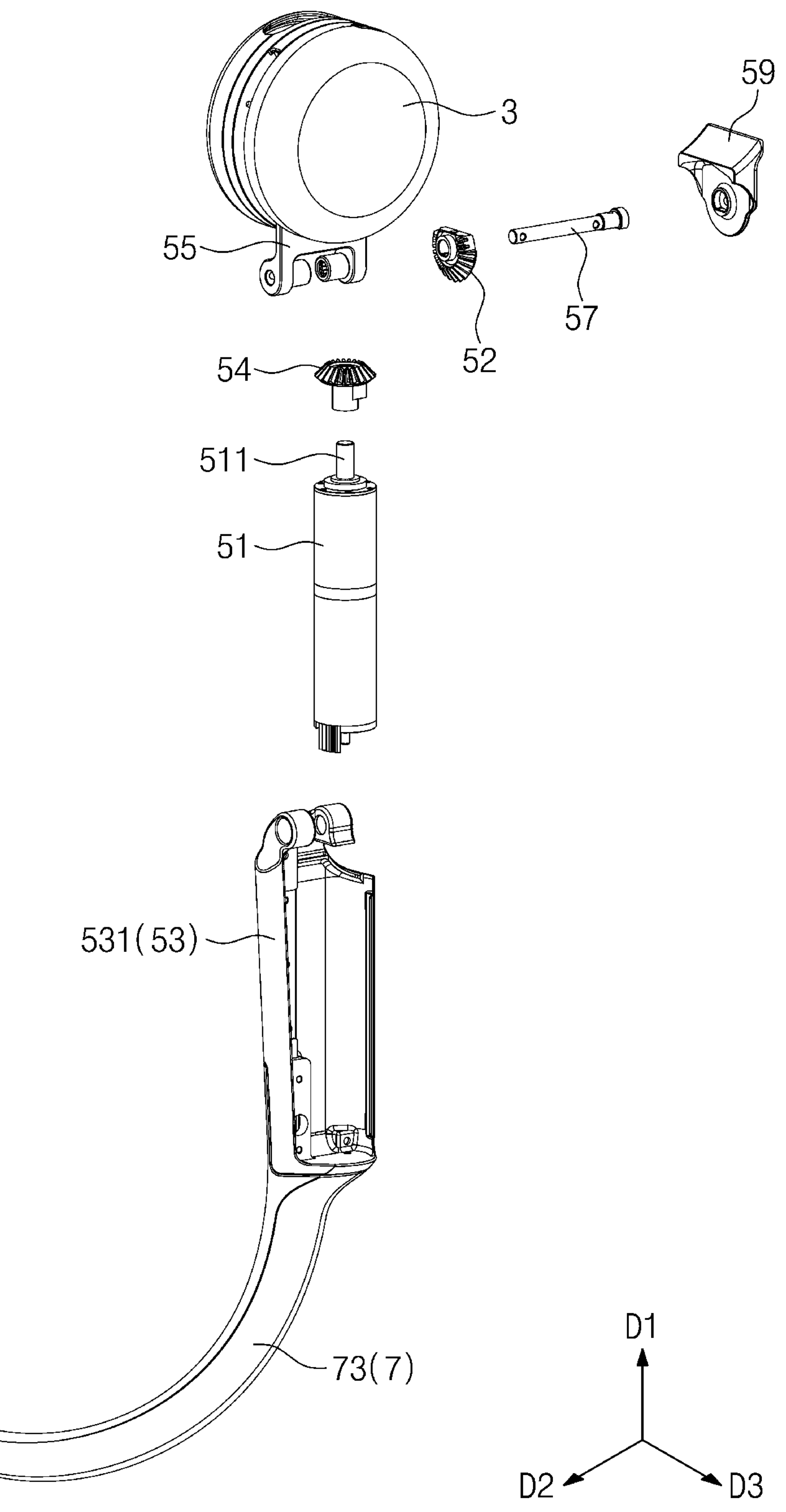
FIG. 4 is an exploded perspective view showing a portion of the motion assistance apparatus according to embodiments of the inventive concept.

FIG. 3 is a partially exploded perspective view showing a portion of a motion assistance apparatus according to embodiments of the inventive concept, and FIG. 4 is an exploded perspective view showing a portion of a motion assistance apparatus according to embodiments of the inventive concept.

Referring to FIGS. 3 and 4, the first driving module 5 may include an abduction motor 51, a module housing 53, a bracket 55, an abduction shaft 57, an upper bevel gear 52, a lower bevel gear 54, and a gear housing 59.

The abduction motor 51 may convert electric energy into rotational energy. A battery (not designated by a reference numeral) may be coupled to the abduction motor 51. The abduction motor 51 may be operated by electric energy provided by the battery. The support module 7 (see FIG. 1) may be adducted and abducted relative to the fixing module 1 (see FIG. 1) by the abduction motor 51. The abduction motor unit 51 may include a motor shaft 511. The motor shaft 511 may extend in the first direction D1. When the abduction motor 51 operates, the motor shaft 511 may rotate about an axis parallel to the first direction D1. The lower bevel gear 54 may be coupled to the motor shaft 511. The lower bevel gear 54 may be rotated by the abduction motor 51 while being coupled to the motor shaft 511. This will be described later in more detail.

The module housing 53 may surround the abduction motor 51. The module housing 53 may be rotatably coupled to the abduction shaft 57. That is, the module housing 53 and the abduction motor 51 inside the module housing 53 may rotate about the abduction shaft 57. The module housing 53 may be connected to the support connector 73. The module housing 53 may include a first housing 531 and a second housing 533. The first housing 531 may be coupled to, for example, the support connector 73. In embodiments, the first housing 531 may be formed integrally with the support connector 73, but the embodiment of the inventive concept is not limited thereto. The second housing 533 may be coupled to the first housing 531 to cover the abduction motor 51.

The bracket 55 may be coupled to the second driving module 3. More specifically, the bracket 55 may be coupled and fixed to a lower side of the second driving module 3.

The abduction shaft 57 may be coupled to the bracket 55. The abduction shaft 57 may extend in the second direction D2. The first axis AX1 (see FIG. 2) of the first driving module 5 may pass through the center of the abduction shaft 57. In embodiments, the abduction shaft 57 may be coupled and fixed to the bracket 55. Therefore, the abduction shaft 57 may be fixed relative to the bracket 55.

The upper bevel gear 52 may be coupled to the abduction shaft 57. For example, the upper bevel gear 52 may be coupled to the rear side of the abduction shaft 57. The upper bevel gear 52 may be placed such that an axis of the upper bevel gear 52 is aligned with the first axis AX1 of the first driving module 5. In embodiments, the upper bevel gear 52 may be coupled and fixed to the abduction shaft 57. Therefore, the upper bevel gear 52 may be fixed relative to the abduction shaft 57 and/or the bracket 55.

The lower bevel gear 54 may be coupled to the motor shaft 511. The lower bevel gear 54 may be placed such that an axis of the lower bevel gear 54 is parallel to the first direction D1. The lower bevel gear 54 may be rotated by the abduction motor 51. The lower bevel gear 54 may engage with the upper bevel gear 52. In the case where the upper bevel gear 52 is fixed to the abduction shaft 57, when the lower bevel gear 54 rotates, the module housing 53 may rotate relative to the second driving module 3. That is, when the abduction motor 51 operates, the support module 7 may rotate about the first axis AX1 relative to the fixing module 1 (see FIG. 1). This will be described later in detail.

The gear housing 59 may cover the upper bevel gear 52. When the upper bevel gear 52 is fixed to the abduction shaft 57, the gear housing 59 may also be fixed to the upper bevel gear 52.

Hereinafter, the abduction motor 51 is illustrated and described as being positioned below the first axis AX1, but the embodiment of the inventive concept is not limited thereto. That is, unlike the configuration illustrated in the drawing, the abduction motor 51 may be coupled to the fixing module 1. More specifically, the abduction motor 51 may be coupled to the fixing coupler 13.

Figure 5:
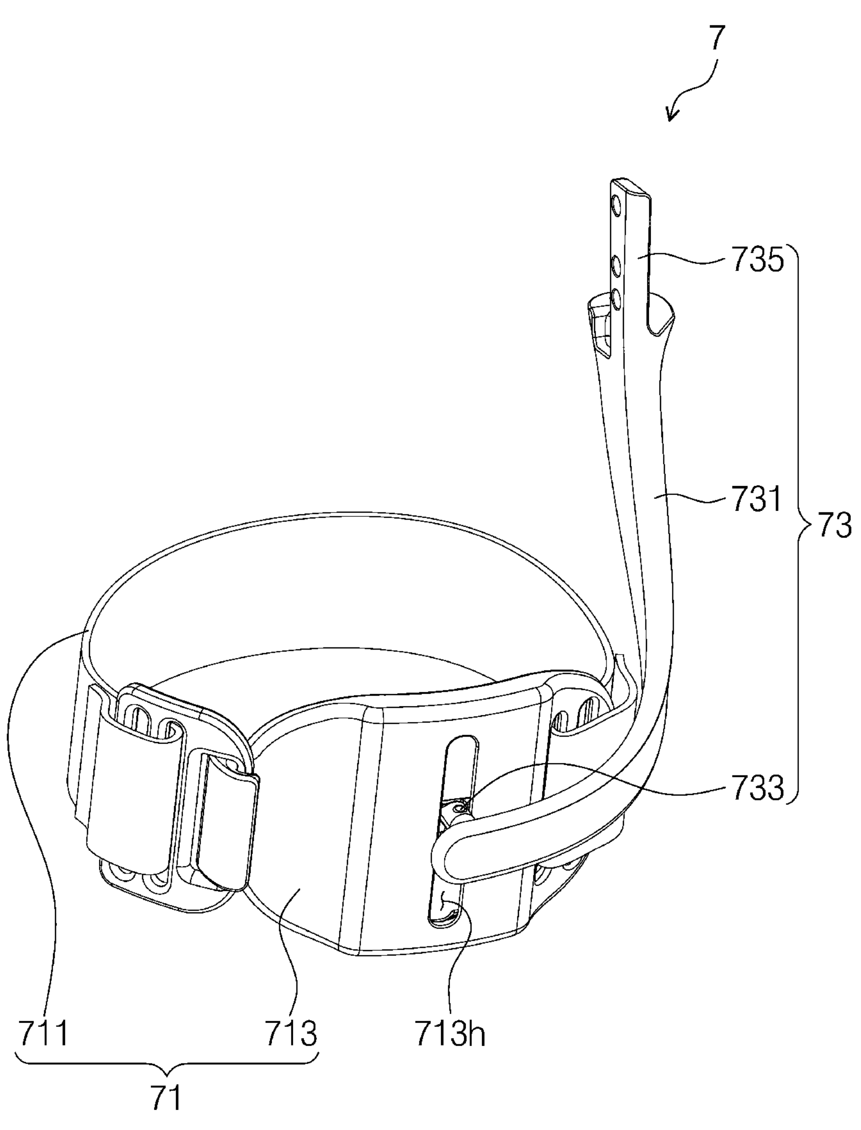
FIG. 5 is a perspective view showing a portion of the motion assistance apparatus according to embodiments of the inventive concept.

FIG. 5 is a perspective view showing a portion of the motion assistance apparatus according to embodiments of the inventive concept.

Referring to FIG. 5, the support connector 73 may include a connection body 731, a slide member 733, and a connection end 735.

The connection body 731 may extend vertically. One side of the connection body 731 may be connected to the first driving module 5 (see FIG. 1). The slide member 733 may be coupled to the other side of the connection body 731.

The slide member 733 may be coupled to the other side of the connection body 731. For example, the slide member 733 may be rotatably coupled to the connection body 731. The slide member 733 may be slidably coupled to the support band 71. More specifically, the slide member 733 may be inserted into the slide hole 713*h* so as to be vertically movable relative to the band coupling portion 713. The slide member 733 will be described later in more detail.

The connection end 735 may be positioned at the upper end of the connection body 731. As a coupling member (not shown) is inserted into the connection end 735, the support connector 73 may be coupled to the module housing 53 (see FIG. 3).

Figure 6:
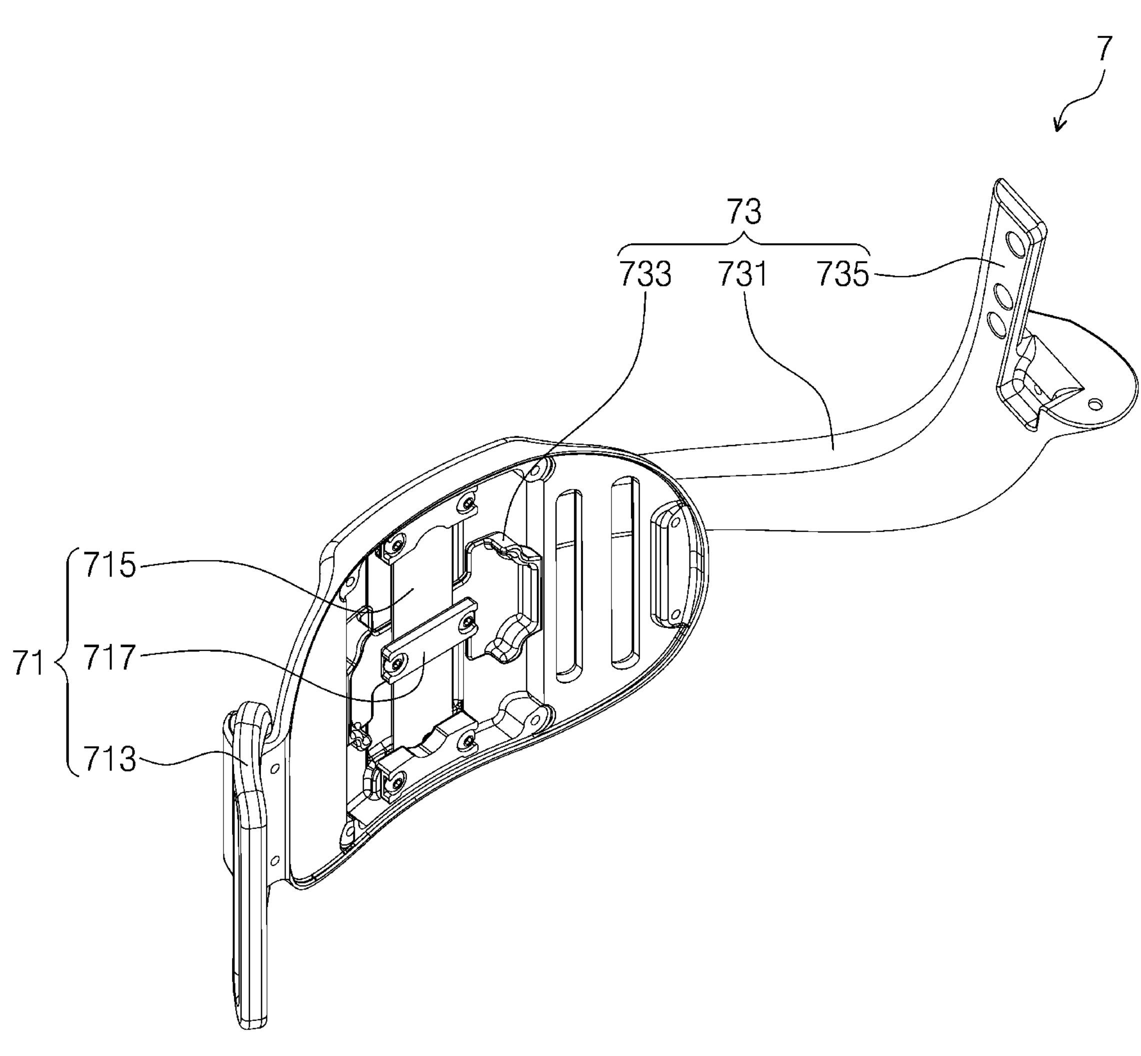
FIG. 6 is a perspective view showing a portion of the motion assistance apparatus according to embodiments of the inventive concept.
Figure 7:
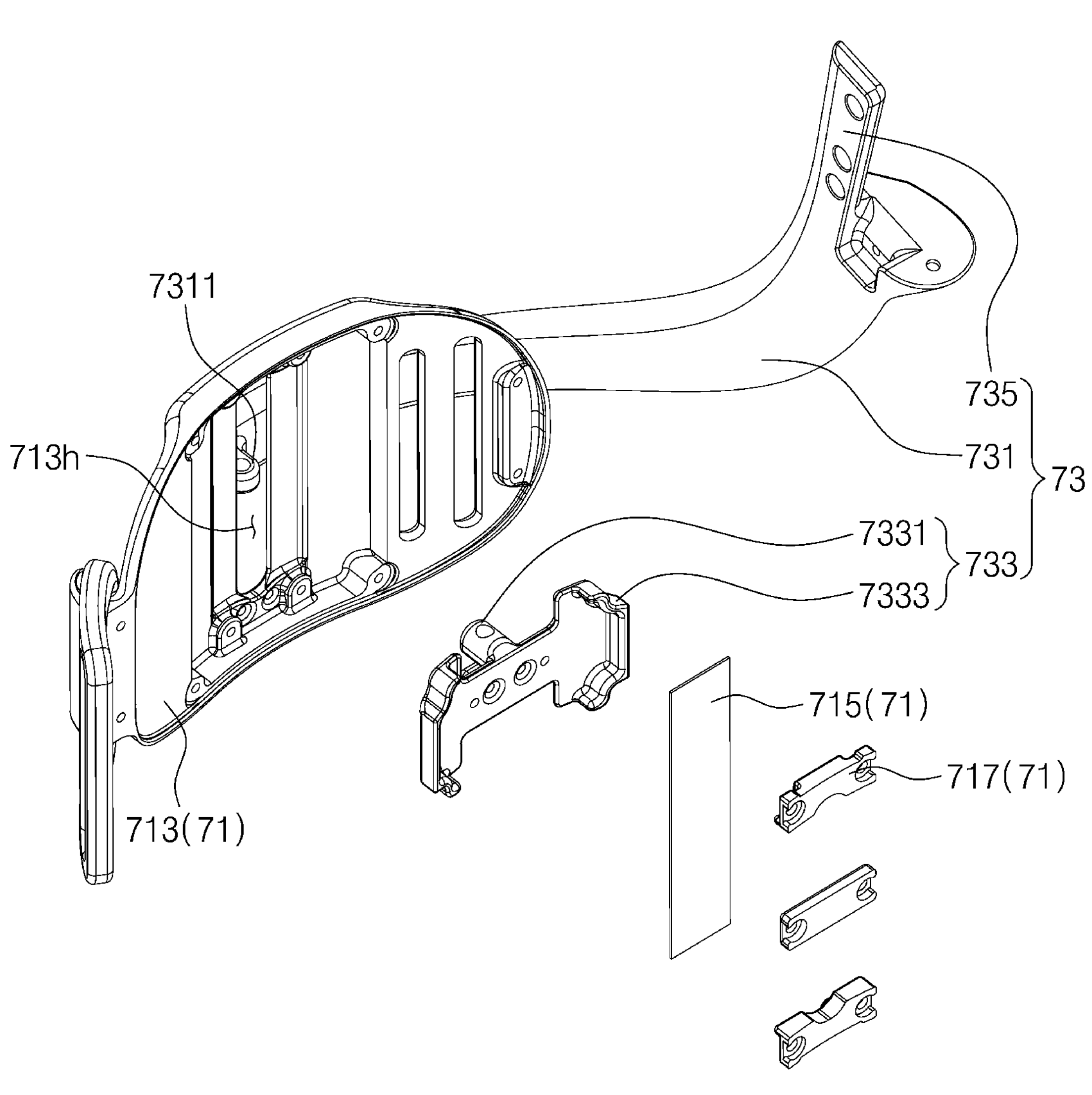
FIG. 7 is an exploded perspective view showing a portion of the motion assistance apparatus according to embodiments of the inventive concept.

FIG. 6 is a perspective view showing a portion of a motion assistance apparatus according to embodiments of the inventive concept, and FIG. 7 is an exploded perspective view showing a portion of a motion assistance apparatus according to embodiments of the inventive concept.

Referring to FIGS. 6 and 7, the slide member 733 may include a connection member 7331 and a slide body 7333.

The connection member 7331 may be coupled to the front surface of the slide body 7333. The connection member 7331 may pass backward and forward through the slide hole 713*h*. The connection member 7331 may vertically move along the slide hole 713*h* within the slide hole 713*h*. The connection body 731 may be rotatably coupled to the connection member 7331. For example, the connection member 7331 may be rotatably coupled to a coupling block 7311 formed at the lower end of the connection body 731.

The slide body 7333 may be located on the rear surface of the band coupling portion 713. The slide body 7333 may vertically move on the rear surface of the band coupling portion 713.

The support band 71 may further include an elastic member 715 and a support block 717.

The elastic member 715 may be coupled to the slide hole 713*h* so as to press the slide member 733. More specifically, the elastic member 715 may be coupled to the rear surface of the band coupling portion 713 so as to press the rear surface of the slide body 7333 and close the slide hole 713*h*. The elastic member 715 may include an elastic material such as rubber, but the embodiment of the inventive concept is not limited thereto.

The support block 717 may fix the elastic member 715 to the rear surface of the band coupling portion 713. A plurality of support blocks 717 may be provided. For example, three support blocks 717 may be provided as illustrated in FIG. 7. The plurality of support blocks 717 may be vertically spaced apart from each other.

When the connection member 7331 moves vertically while being inserted into the slide hole 713*h*, the slide member 733 may move vertically on the rear surface of the band coupling portion 713. Accordingly, the entire support connector 73 may move vertically relative to the support band 71. In this case, the elastic member 715 may press the slide member 733. Therefore, the sliding motion may be possible only by a force having a certain magnitude or more. That is, it is possible to prevent the support connector 73 from arbitrarily moving up and down.

Figure 8:
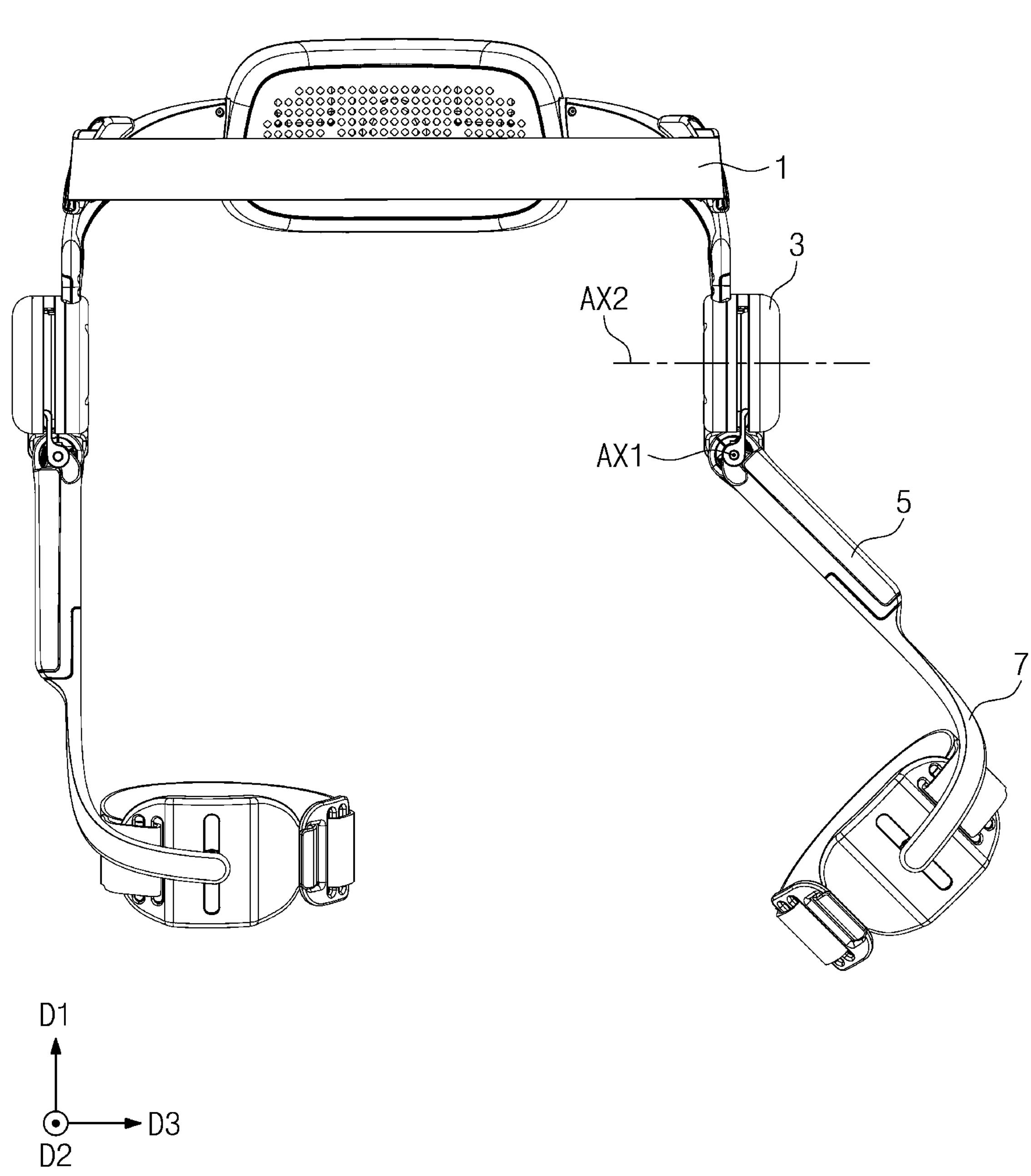
FIG. 8 is a front view showing a use state of the motion assistance apparatus according to embodiments of the inventive concept.

FIG. 8 is a front view showing a use state of a motion assistance apparatus according to embodiments of the inventive concept.

Referring to FIG. 8, the support module 7 may abduct and adduct relative to the fixing module 1. More specifically, the support module 7 may abduct and adduct about the first axis AX1 by the first driving module 5 described with reference to FIGS. 3 and 4. In this case, since the second driving module 3 is above the first driving module 5, the second driving module 3 may not move even if the support module 7 abducts and adducts.

Figure 9:
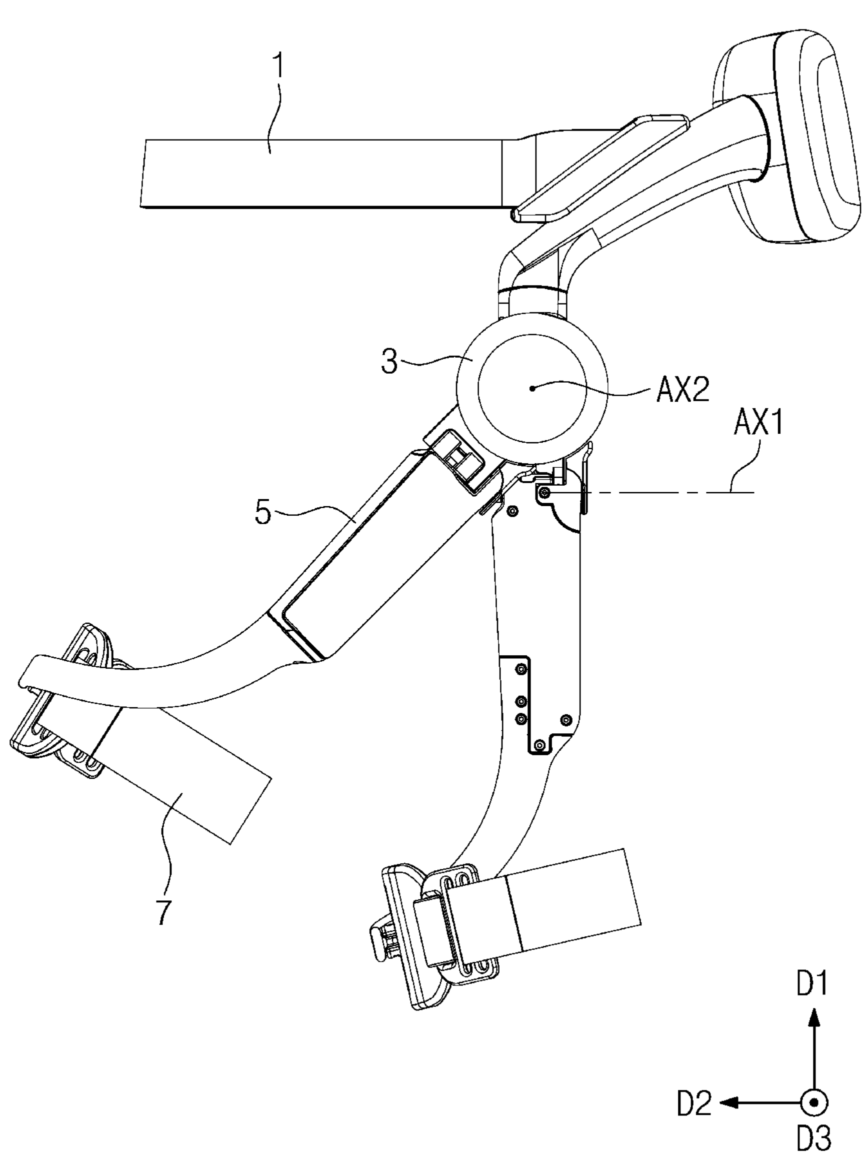
FIG. 9 is a side view showing a use state of the motion assistance apparatus according to embodiments of the inventive concept.

FIG. 9 is a side view showing a use state of a motion assistance apparatus according to embodiments of the inventive concept.

Referring to FIG. 9, the support module 7 may flex and extend relative to the fixing module 1. More specifically, the support module 7 may flexes and extends about the second axis AX2 by the second driving module 3. In this case, since the second driving module 3 is above the first driving module 5, the first driving module 5 may also move together when the support module 7 flexes and extends.

In the motion assistance apparatus according to embodiments of the inventive concept, it is possible to assist the abduction of the legs. That is, it is possible to assist not only the flexion and extension necessary for the user to walk forward, but also the leg spreading of the user to the side. Therefore, it is possible to prevent the user from falling sideways.

In the motion assistance apparatus according to embodiments of the inventive concept, the driving force may be applied by using the abduction motor when the leg abducts. Therefore, even when the leg of the user is weak, the user may easily spread the leg to the side.

In the motion assistance apparatus according to embodiments of the inventive concept, the first driving module for the abduction may be positioned below the second driving module for the flexion. Therefore, the abduction of the leg independent of the flexion of the leg may be possible.

In the motion assistance apparatus according to embodiments of the inventive concept, the support connector is movable relative to the support band. More specifically, the support connector may slide vertically relative to the support band. Since the first axis serving as the abduction axis is positioned outside the leg of the user, the rotation axis of the support module may be located outside the rotation axis of the leg of the user. Accordingly, the abduction trajectory of the leg of the user may be different from the abduction trajectory of the support module. The support connector is movable relative to the support band, and thus, it is possible to compensate for this trajectory difference. Therefore, when using the motion assistance apparatus, natural movement may be possible.

The motion assistance apparatus may assist abduction of the legs.

The motion assistance apparatus may abduct independently of flexion.

The motion assistance apparatus may apply the driving force when the leg abducts.

The motion assistance apparatus may compensate for the eccentricity of the rotation center of abduction of the motion assistance apparatus from the rotation center of the leg of the body.

The effects of the present disclosure are not limited to the aforementioned effects, but other effects not described herein will be clearly understood by those skilled in the art from the following description.

Although the embodiments of the inventive concept are described with reference to the accompanying drawings, those skilled in the art to which the present disclosure pertains will understand that the present disclosure can be carried out in other specific forms without changing the technical idea or essential features. Therefore, the above-described embodiments are to be considered in all aspects as illustrative and not restrictive.

What is claimed is:

1. A motion assistance apparatus comprising:

a fixing module configured to be fixed to a part of the body of a user;

a support module configured to support another part of the body of the user and is rotatable relative to the fixing module;

a first driving module which is positioned between the fixing module and the support module and abducts the support module relative to the fixing module; and a second driving module which flexes the support module relative to the fixing module, wherein the first driving module comprises an abduction motor, and a first axis configured to be an abduction axis of the first driving module is positioned at the same height as or lower than a second axis configured to be a flexion axis of the second driving module, wherein the first driving module further comprises:

a bracket fixed to a lower side of the second driving module;

an abduction shaft coupled to the bracket;

an upper bevel gear coupled to the abduction shaft; and a lower bevel gear which engages with the upper bevel gear and is connected to the abduction motor, wherein the abduction motor is connected to the abduction shaft to be rotatable about the abduction shaft.

2. The motion assistance apparatus of claim 1, wherein the first driving module further comprises a module housing that surrounds the abduction motor, and the module housing is rotatably coupled to the abduction shaft.

3. The motion assistance apparatus of claim 2, wherein the support module comprises:

a support band configured to be fixed to the leg of the user; and a support connector configured to connect the support band to the first driving module, wherein the support connector is coupled to the module housing.

4. The motion assistance apparatus of claim 1, wherein the abduction shaft is coupled and fixed to the bracket, the upper bevel gear is coupled and fixed to the abduction shaft, and the lower bevel gear is rotated by the abduction motor.

5. The motion assistance apparatus of claim 1, wherein the second driving module comprises a flexion motor.

6. The motion assistance apparatus of claim 1, wherein the fixing module comprises:

a fixing band configured to be fixed to the waist of the user; and a fixing coupler configured to connect the fixing band to the second driving module.

7. The motion assistance apparatus of claim 1, wherein the support module comprises:

a support band configured to be fixed to the leg of the user; and a support connector configured to connect the support band to the first driving module, wherein the support band provides a slide hole, and a portion of the support connector is inserted into the slide hole, and the support connector is slidably coupled to the support band.

8. The motion assistance apparatus of claim 1, wherein the second driving module is positioned between the fixing module and the first driving module.

9. The motion assistance apparatus of claim 1, wherein the first driving module further comprises:

a motor shaft coupled to the lower bevel gear and configured to rotate the lower bevel gear about an axis perpendicular to a plane defined by the first axis and the second axis;

a module housing surrounding the abduction motor and being rotatably coupled to the abduction shaft about the first axis; and a gear housing covering the upper bevel gear.

10. A motion assistance apparatus comprising:

a fixing module configured to be fixed to the waist of a user;

a support module configured to support the leg of the user; and a first driving module which is positioned between the fixing module and the support module and abducts the support module relative to the fixing module, wherein the support module comprises:

a support band configured to be fixed to the leg of the user; and a support connector configured to connect the support band to the first driving module, wherein the support band provides a slide hole, and a portion of the support connector is inserted into the slide hole, and the support connector is slidably coupled to the support band, wherein the support connector comprises:

a connection body of which one side is connected to the first driving module; and a slide member which is connected to the other side of the connection body and of which a portion is inserted into the slide hole, and wherein the slide member is rotatably coupled to the connection body;

wherein the first driving module comprises an abduction motor, and a first axis configured to be an abduction axis of the first driving module is positioned at the same height as or lower than a second axis configured to be a flexion axis of the second driving module, wherein the first driving module further comprises:

a bracket fixed to a lower side of the second driving module;

an abduction shaft coupled to the bracket;

an upper bevel gear coupled to the abduction shaft; and a lower bevel gear which engages with the upper bevel gear and is connected to the abduction motor;

wherein the abduction motor is connected to the abduction shaft to be rotatable about the abduction shaft.

11. The motion assistance apparatus of claim 10, wherein the slide hole extends vertically.

12. The motion assistance apparatus of claim 10, wherein the support band further comprises an elastic member, and the elastic member is coupled to the slide hole to press the slide member.

13. The motion assistance apparatus of claim 10, wherein two support modules are provided, and the two support modules are spaced apart from each other in a horizontal direction.

14. The motion assistance apparatus of claim 10, further comprising a second driving module which is positioned between the fixing module and the first driving module and flexes the support module relative to the fixing module.

15. The motion assistance apparatus of claim 10, wherein the first driving module further comprises:

a motor shaft coupled to the lower bevel gear and configured to rotate the lower bevel gear about an axis perpendicular to a plane defined by the first axis and the second axis;

a module housing surrounding the abduction motor and being rotatably coupled to the abduction shaft about the first axis; and a gear housing covering the upper bevel gear.

16. A motion assistance apparatus comprising:

a support module;

a fixing module spaced apart from the support module in a first direction;

a first driving module which is positioned between the support module and the fixing module and rotates the support module relative to the fixing module; and a second driving module which is positioned between the first driving module and the fixing module and rotates the support module relative to the fixing module, wherein the first driving module rotates the support module about a second direction that crosses the first direction, and the second driving module rotates the support module about a third direction that crosses both the first direction and the second direction, wherein the support module comprises:

a support band configured to be fixed to the leg of a user; and a support connector configured to connect the support band to the first driving module, wherein the support band provides a slide hole, and a portion of the support connector is inserted into the slide hole, and the support connector is slidably coupled to the support band, and wherein the support connector comprises:

a connection body of which one side is connected to the first driving module; and a slide member which is connected to the other side of the connection body and of which a portion is inserted into the slide hole, wherein the slide member is rotatably coupled to connection body;

wherein the first driving module comprises an abduction motor, and a first axis configured to be an abduction axis of the first driving module is positioned at the same height as or lower than a second axis configured to be a flexion axis of the second driving module, wherein the first driving module further comprises:

a bracket fixed to a lower side of the second driving module;

an abduction shaft coupled to the bracket;

an upper bevel gear coupled to the abduction shaft;

a lower bevel gear which engages with the upper bevel gear and is connected to the abduction motor;

a motor shaft coupled to the lower bevel gear and configured to rotate the lower bevel gear about an axis perpendicular to a plane defined by the first axis and the second axis;

a module housing surrounding the abduction motor and being rotatably coupled to the abduction shaft about the first axis; and a gear housing covering the upper bevel gear, wherein the abduction motor is connected to the abduction shaft to be rotatable about the abduction shaft.

17. The motion assistance apparatus of claim 16, wherein two support modules are provided, and the two support modules are spaced apart from each other in the third direction.

18. The motion assistance apparatus of claim 16, wherein the first driving module comprises an abduction motor, and the second driving module comprises a flexion motor.

* * * * *